United States Patent [19]
Staley

[11] Patent Number: 5,593,032
[45] Date of Patent: Jan. 14, 1997

[54] DISC RETAINER DEVICE

[76] Inventor: Leland Staley, 212 Liberty St., Rock Springs, Wyo. 82901

[21] Appl. No.: 409,357

[22] Filed: Mar. 23, 1995

[51] Int. Cl.⁶ .................................................. B65D 85/57
[52] U.S. Cl. ..................... 206/309; 206/308.1; 206/312; 206/425; 211/40
[58] Field of Search ................................ 206/307, 308.1, 206/309, 311, 425, 312, 313; 211/40

[56] References Cited

U.S. PATENT DOCUMENTS

| | | |
|---|---|---|
| 879,279 | 2/1908 | Lindstrom et al. ............... 206/309 X |
| 1,429,076 | 9/1922 | Helsley ................................ 211/40 X |
| 3,112,966 | 12/1963 | Reid . |
| 4,138,703 | 2/1979 | Stave et al. . |
| 4,145,726 | 3/1979 | Conaty . |
| 4,588,086 | 5/1986 | Coe . |
| 4,717,019 | 1/1988 | Ackeret . |
| 4,747,484 | 5/1988 | Ackeret . |
| 4,771,883 | 9/1988 | Herr et al. . |
| 4,875,743 | 10/1989 | Gelardi et al. ..................... 206/309 X |
| 4,899,875 | 2/1990 | Herr et al. . |
| 4,928,818 | 5/1990 | Friess et al. . |
| 5,011,010 | 4/1991 | Francis et al. . |
| 5,085,318 | 2/1992 | Leverick . |
| 5,201,414 | 4/1993 | Kazubinski ....................... 206/309 |
| 5,295,577 | 3/1994 | Minter . |
| 5,307,926 | 5/1994 | Mee .................................... 206/311 |

FOREIGN PATENT DOCUMENTS

| | | | |
|---|---|---|---|
| 1179391 | 10/1964 | Germany .............................. 211/40 |
| 0214568 | 9/1987 | Japan .................................. 206/309 |
| 0665044 | 4/1988 | Switzerland ...................... 206/308.1 |

*Primary Examiner*—Bryon P. Gehman
*Attorney, Agent, or Firm*—Trask, Britt & Rossa

[57] ABSTRACT

A device is provided for retaining flat, substantially round discs therein, including compact discs, laser discs and vinyl discs, in a manner which facilitates insertion and removal of a disc from the retainer device with a single hand. The device provides means for inserting and removing discs therefrom in a manner which avoids touching the recorded or encoded portion of the disc. The device is configured to facilitate conjoining or stacking of a multiple number of the devices together while maintaining the discs in a spaced apart arrangement thereby avoiding damage to the discs.

13 Claims, 4 Drawing Sheets

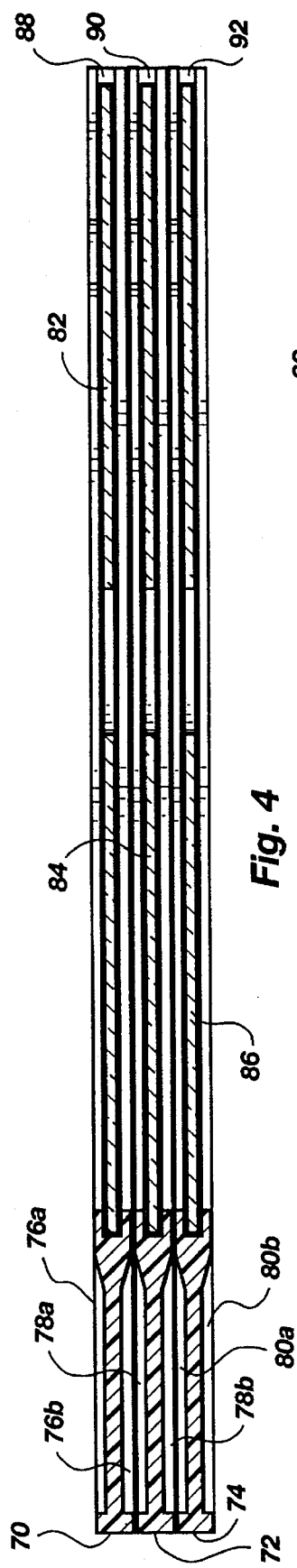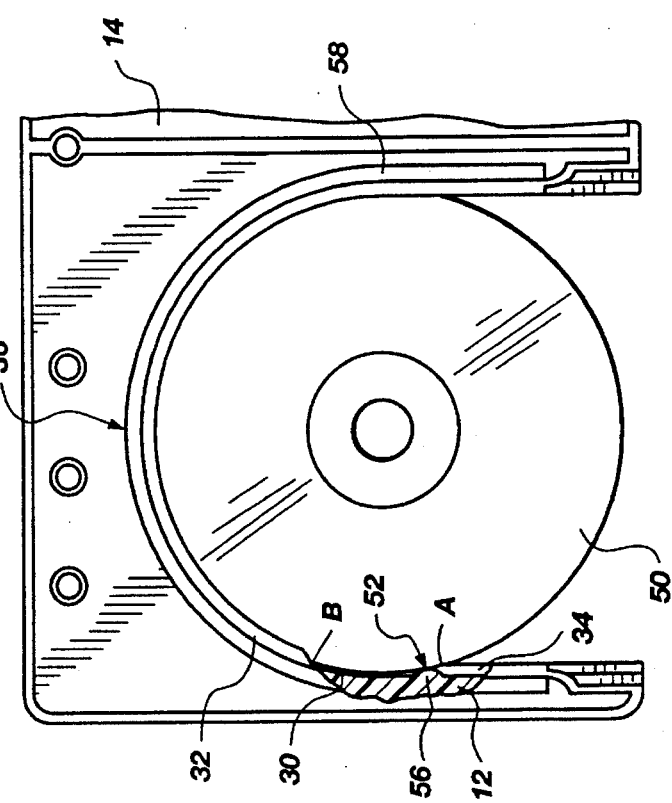

DISC RETAINER DEVICE

BACKGROUND

1. Field of Invention

This invention relates generally to means for retaining compact discs and the like, and relates specifically to a disc retainer which provides easy insertion and removal of a disc therefrom.

2. Statement of the Relevant Art

Compact discs are most prevalently used as the recording medium for digitally recorded music, and have effectively rendered obsolete the use of phonographs for recording. In more recent years, compact discs have been used as the recording medium for archiving any number and type of documents, such as encyclopedias and databases of compiled information, which may be accessed by use of CD-ROM hardware. Similarly, laser discs have been used to encode certain information, typically movies and other forms of entertainment. Laser discs are similar to compact discs in geometry and configuration, but are larger in diameter, and possibly other dimensions, than compact discs.

With the increased use of compact discs and laser discs has come the need to store them in a manner which will protect them from dust and damage. Several storage means have been suggested in the patent literature which generally comprise a disc retaining clip which is insertable within an outer sleeve. Examples of such devices are illustrated in U.S. Pat. No. 5,292,577 to Minter; U.S. Pat. No. 5,011,010 to Francis, et al.; U.S. Pat. No. 4,899,875 to Herr, et al.; U.S. Pat. No. 4,747,484 to Ackeret; and U.S. Pat. No. 4,717,019 to Ackeret. Other forms of disc holders are disclosed in U.S. Pat. No. 4,928,818 to Friess, et al., and U.S. Pat. No. 5,085,318 to Leverick.

The compact disc holders described in the patent literature provide adequate means of storing compact discs, but entail numerous manipulations requiting both hands to remove a disc from, or insert a disc into, the holder. Many occasions arise when a person desires or needs to access a compact disc and only has one hand available to remove the disc from a holder. Such occasions may be most frequently encountered while driving in a car and listening to music. Similarly with laser discs, one may wish to access a laser disc and may have only one hand to do so.

Thus, it would be advantageous to provide a disc holder which securely retains discs therein, which permits the ready removal and insertion of discs therefrom with a single hand, and which allows the multiple retention and stacking of discs in a suitably configured binder or storage means.

SUMMARY OF THE INVENTION

In accordance with the present invention, a disc retainer is provided for securely retaining flat, circular discs therein which advantageously permits the insertion and removal of such discs with a single hand, which permits insertion and removal of such discs in a manner which prevents placement of the fingers on the discs, and which permits stacking of multiple such retainers in a manner which positions the stacked discs apart from each other to avoid damaging contact therebetween. The disc retainer of the present invention is suitable for retaining any type of flat, circular disc including a compact disc, a video laser disc and a vinyl record. However, for ease of disclosure and by way of example, the invention will be described hereinafter in terms of its use for retaining compact discs.

The present invention generally comprises a non-linear channel formed in a flattened retainer plate or leaf, the channel being sized in dimension and configured to receive and retain the outer edge of a disc. The channel may preferably be substantially U-shaped with the bottom arcuate portion of the channel being sized to receive the disc therein in seated registration. However, other suitable shapes or configurations of the channel may be adapted for use in the invention to retain a disc.

The retainer plate or leaf is generally flattened and has a peripheral edge thereabout. The retainer plate may typically be rectangular in shape, as defined by the peripheral edge, although other geometries may be equally suitable. At least one channel is foraged in the retainer plate and an opening to the channel is provided at the peripheral edge of the plate. The retainer plate may be formed with a spacing surface associated with at least one side of the plate, the spacing surface being positioned to extend above or away from a surface of the plate to maintain adjacently positioned plates at a distance from each other. The spacing surface may take the form of a raised edge encircling the plate, a tab or protuberance extending outwardly from a surface of the plate, or any other suitable means. Preferably, a spacing surface is associated with both sides or surfaces of the plate to enable stacking of multiple numbers of plates together, while preventing contact between the discs retained within the channels of each plate. The retainer plate or leaf of the invention may be made of any suitable material, although molded plastic is a particularly suitable material given its cost, durability and light weight.

A channel formed in the retainer plate comprises a groove with a lip portion positioned on both sides of the groove such that the channel, viewed in cross section, is U-shaped. The lip portions enclose or engage the very outer edge of the disc and maintain the disc within the groove. Edge engagement means are also associated with the channel to engage the edge of the disc at a point along its circumference to prevent the disc from slipping out of the channel. The edge engagement means may be any suitable device, including a protuberance within the channel, which provides a friction or mechanical fit therebetween. Other appropriate edge engagement means may include a spring-loaded pin or detent, or any similar means.

Opposing and aligned ledges are formed in one lip of the channel near the opening of the channel at the periphery of the retainer plate. The opposing ledges facilitate insertion of the disc within the channel and effectively permit insertion of the disc with a single hand. That is, alignment of any flattened, disk-shaped object with a groove, and insertion of the disk within that groove can be very difficult and may require a very steady hand and keen eye. That is especially true where the tolerances between the groove and the disk-shaped object are very small. The present invention is uniquely configured, by virtue of the opposing ledges, to eliminate the need to align the disk with the channel for insertion. The disc is merely positioned in the opening of the channel near the periphery of the retainer plate and is positioned against the opposing ledges at an angle to the plane of the channel. The disc is then rotated, while still positioned against the opposing ledges, until the disc is parallel to the plane of the channel. The disc is automatically aligned for insertion within the channel and may be urged into seated registration with the bottom of the channel. The construction of the channel not only facilitates insertion of the disc within the channel, but permits handling and insertion of the disc with a finger positioned through the central hole of the disc and the thumb positioned along the edge of the disc. Such handling avoids contacting the disc with one's fingers.

The retainer plate may be formed with means for securing the retainer plate in a binder, box or other appropriate device permitting a number of retainer plates to be held together in substantially adjacent and movable orientation to each other. In a particularly suitable embodiment, the retainer plate may be formed with a plurality of aligned and spaced apart holes which correspond to conventional multiple ring (i.e., 2-ring or 3-ring) binders. Other means for securing the retainer plates in adjacent movable orientation to each other may be adapted to the intended use and storage of the disc retainers.

BRIEF DESCRIPTION OF THE DRAWINGS

In the drawings, which illustrate what is currently considered to be the best mode for carrying out the invention.

FIG. 3 is a partial plan view of the disc retainer device shown in FIG. 2, in partial cutaway, illustrating placement of the compact disc fully within the channel and securely engaged by the edge engagement means of the invention;

FIG. 4 is a view in cross section of three disc retainer devices of the present invention in parallel aligned and adjacent orientation to each other, each containing a compact disc inserted within the channel thereof.

DETAILED DESCRIPTION OF THE ILLUSTRATED EMBODIMENTS

Figure 1:
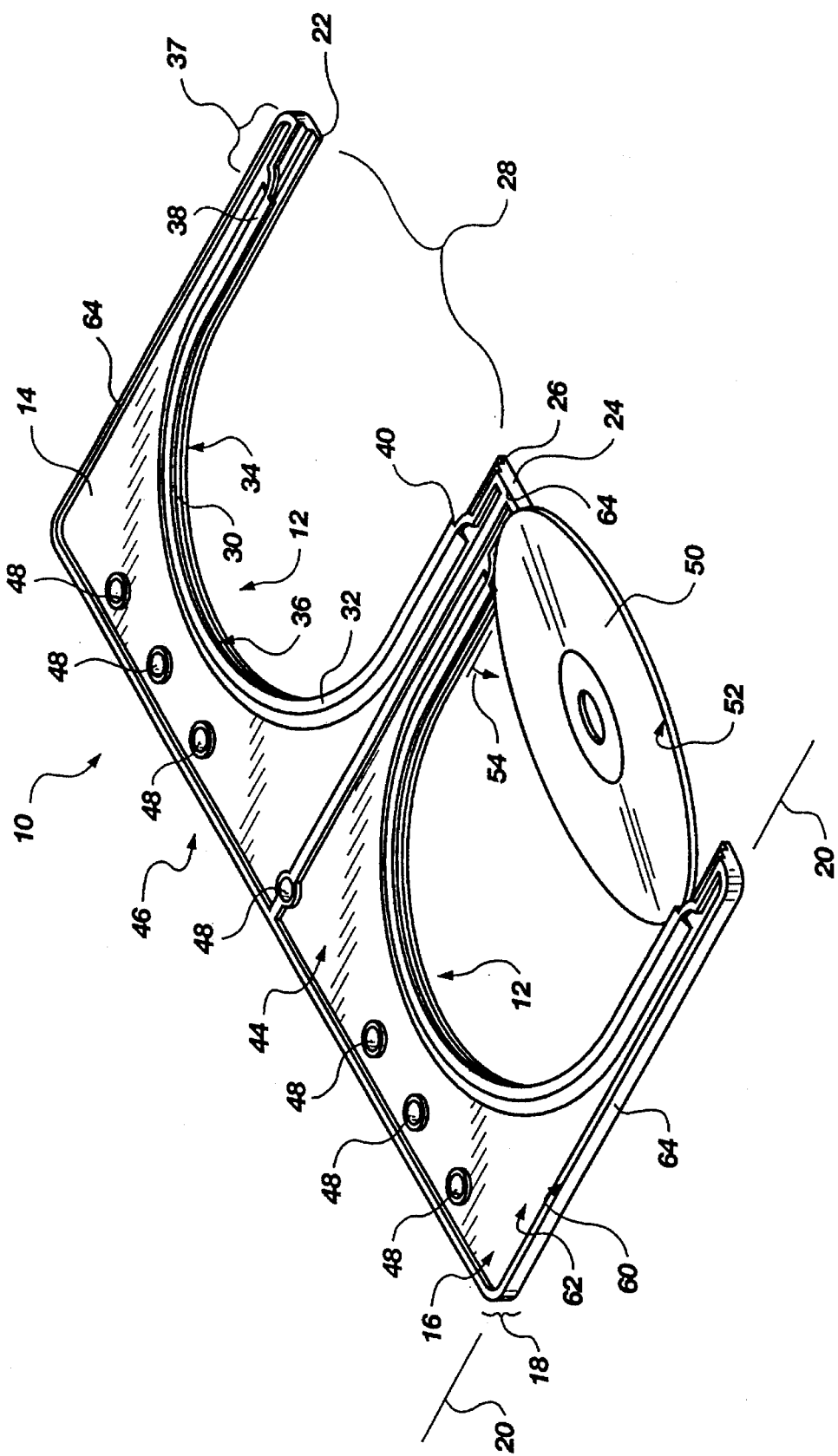
FIG. 1 is a view in perspective of a disc retainer device of the present invention illustrating the initial alignment of a compact disc for insertion into the channel of the device.

The disc retainer 10 of the present invention, as illustrated in FIG. 1, is generally comprised of at least one channel 12 formed in a flattened leaf or retainer plate 14. Although two channels 12 are shown adjacently positioned in a single retainer plate 14, the disc retainer 10 of the invention may alternatively be constructed with a single channel 12 or more than two channels 12 therein. The retainer plate 14 comprises a first side 16 and a second, opposing side (not seen in FIG. 1), and a thickness 18 defined between the first side 16 and second, opposing side. The retainer plate 14 may generally be rectangular in shape, as shown, or may be of any other suitable geometry, including square or round.

At least one channel 12 is formed in the retainer plate 14 in a plane 20 existing parallel to the first side 16 of the retainer plate 14. The channel 12 is non-linear and extends a length between a first point 22 associated with the outer periphery 24 of the retainer plate 14 and a second point 26 associated with the outer periphery 24 of the retainer plate 14. Thus, an opening 28 to the channel 12 is formed through the periphery 24 of the retainer plate 14 and is defined between the first point 22 and the second point 26. The channel 12 is comprised of a groove 30 having a first lip 32 positioned on one side thereof oriented toward the first side 16 of the retainer plate 14, and a second lip 34 positioned on the other side of the groove 30 and oriented toward the second side of the retainer plate 14. The first lip 32 and second lip 34 enclose the edge of a compact disc to retain the disc within the channel 12, as described further hereinafter. The channel 12 may generally be U-shaped as shown, having an arcuate bottom portion 36 sized and configured to retain the arcuate edge of a round, flattened disc. However, the channel 12 may take any other appropriate shape or configuration as may be adequate to retain a disc within the plane 20 of the retainer plate 14.

The second lip 34 of the channel begins and ends at the outer periphery 24 of the retainer plate 14 at points 22 and 26, respectively. However, the first lip 32 begins at a distance 37 from the outer periphery 24 of the retainer plate 14. Thus, the first lip 32 begins at a first ledge member 38 and ends at a second ledge member 40. The two ledge members 38, 40 are aligned and opposing each other relative to the first lip 32.

The retainer plate 14 also has formed along an edge 44 thereof, opposite the edge through which the opening 28 is formed, means 46 for securing the retainer plate 14 in a adjacent registration with other retainer plates 14. As illustrated in FIG. 1, the means 46 for securing the retainer plate 14 to others may be a plurality of apertures 48 formed through the retainer plate 14 and spaced apart to accommodate the positioning of a ring (FIG. 5) therethrough for placement in a binder or similar storage device, as described further hereinafter.

Figure 2:
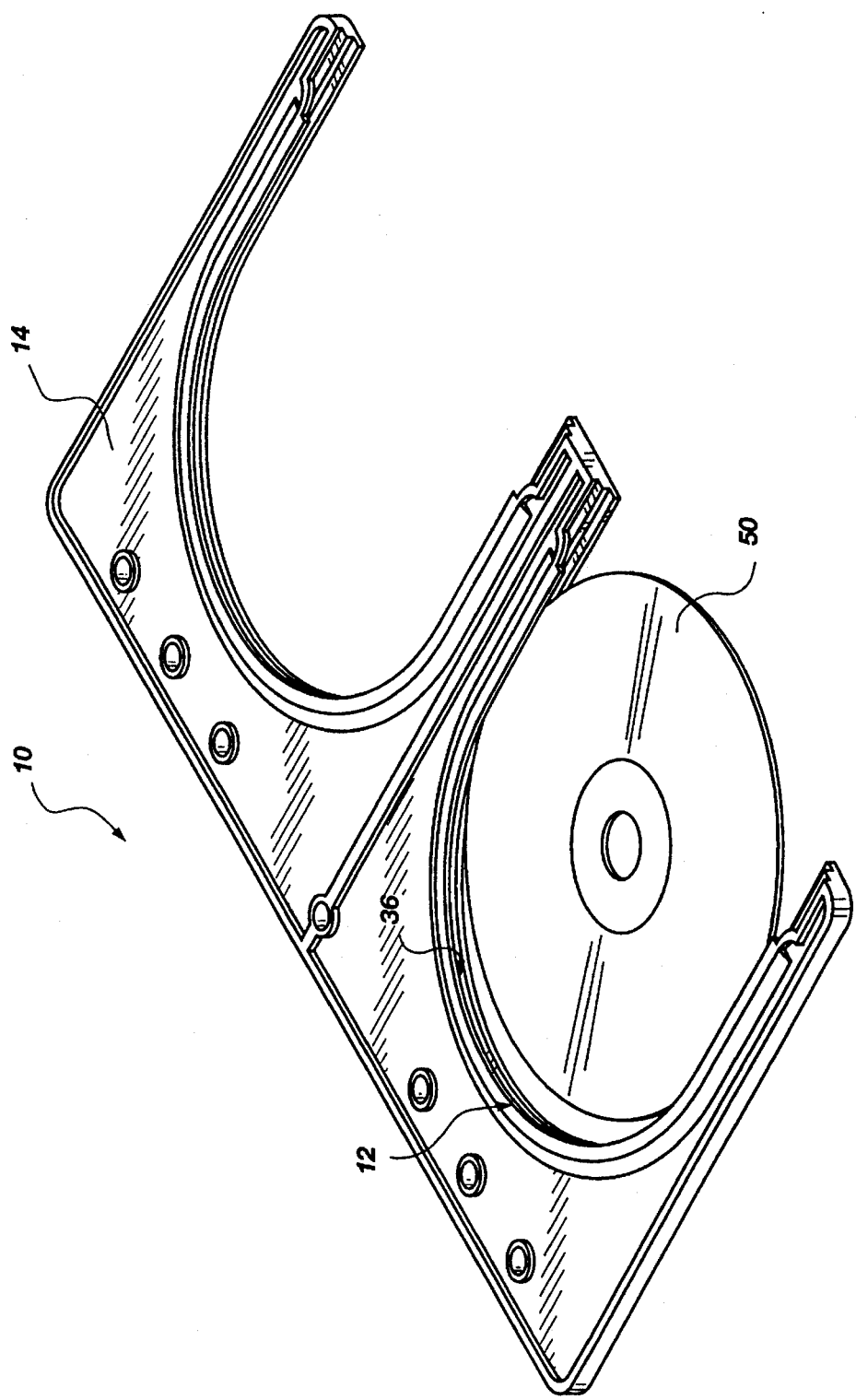
FIG. 2 is a view in perspective of the disc retainer device shown in FIG. 1 where the compact disc is aligned with the channel and partially inserted therein.

As illustrated by FIGS. 1 and 2, a compact disc 50 is positionable for storage in the disc retainer device 10 of the present invention by first bringing the outer edge 52 of the compact disc 50 in contact with the aligned and opposing ledges 38, 40 of the first lip 32 of the channel 12. The compact disc 50 is held at an angle 54 to the plane 20 of the retainer plate 14 or the channel 12. While maintaining the compact disc 50 in contact with the first ledge member 38 and second ledge member 40, the compact disc 50 is rotated to align the disc 50 along the plane 20, or along the channel 12, as shown by FIG. 2. The compact disc 50 is then urged toward the bottom 36 of the channel 12.

As illustrated in FIG. 3, once the disc 50 is positioned within the groove 30 of the channel 12 and is in seated registration with the bottom 36 of the channel 12, edge engagement means 56, shown in FIG. 3 as a protuberance formed in the groove 30 of the channel 12, contacts the edge 52 of the disc 50. The edge engagement means 56 provides a mechanical or friction fit between the edge 52 of the disc 50 and the edge engagement means 56 to secure the disc 50 within the channel 12. It should be noted that the disc 50 need not be positioned completely within the channel 12 (i.e., in complete registration with the bottom 36 of the channel 12) for the edge engagement means 56 to secure the disc 50 within the channel 12 because the edge engagement means 56 is configured to provide sufficient contact with the edge 52 of the disc 50 at any point along the edge 52 from about point A to about point B, as shown by FIG. 3. Further, although only one edge engagement means 56 is shown associated with the channel 12, another edge engagement means 56 may be associated with the other side 58 of the channel 12.

The retainer plate 14 of the invention is configured with a spacing surface 60, illustrated in FIGS. 1 and 2, which extends above or away from the surface 62 of the side 16 of the retainer plate 14. As illustrated in FIG. 1, the spacing surface 60 may be provided by a peripheral raised edge 64 which extends a distance above the surface 62 of the side 16 of the retainer plate 14. A spacing surface 60 may be associated with only a single side of the retainer plate 14 or may be associated, preferably, with both sides of the retainer plate 14. Further, the spacing surface 60 may take any alternate form, including a tab or protuberance positioned on the surface 62 of a side of the retainer plate 14. The spacing surface 60 of the retainer plate 14 permits the stacking together, or the adjacent placement, of multiple numbers of retainer plates 14 while maintaining a space between the discs 50 positioned within the channels 12 of each retainer plate 14 adjacently stacked.

The stacking capability of the present invention is best demonstrated in FIG. 4 where three retainer plates 70, 72, 74 are shown stacked together in alignment. It can be seen that each retainer plate 70, 72, 74 is configured with a raised edge 76a, 76b, 78a, 78b, 80a, 80b which extends away from either side of the retainer plate 70, 72, 74. A compact disc 82, 84, 86 is positioned within the groove 88, 90, 92 of each retainer plate 70, 72, 74, respectively, and it can be seen that the compact discs 82, 84, 86 are spaced apart from each other when stacked in the illustrated fashion by virtue of the spacing surfaces, or raised edge 76a, 76b, 78a, 78b, 80a, 80b of each retainer plate 70, 72 74, respectively.

Figure 5:
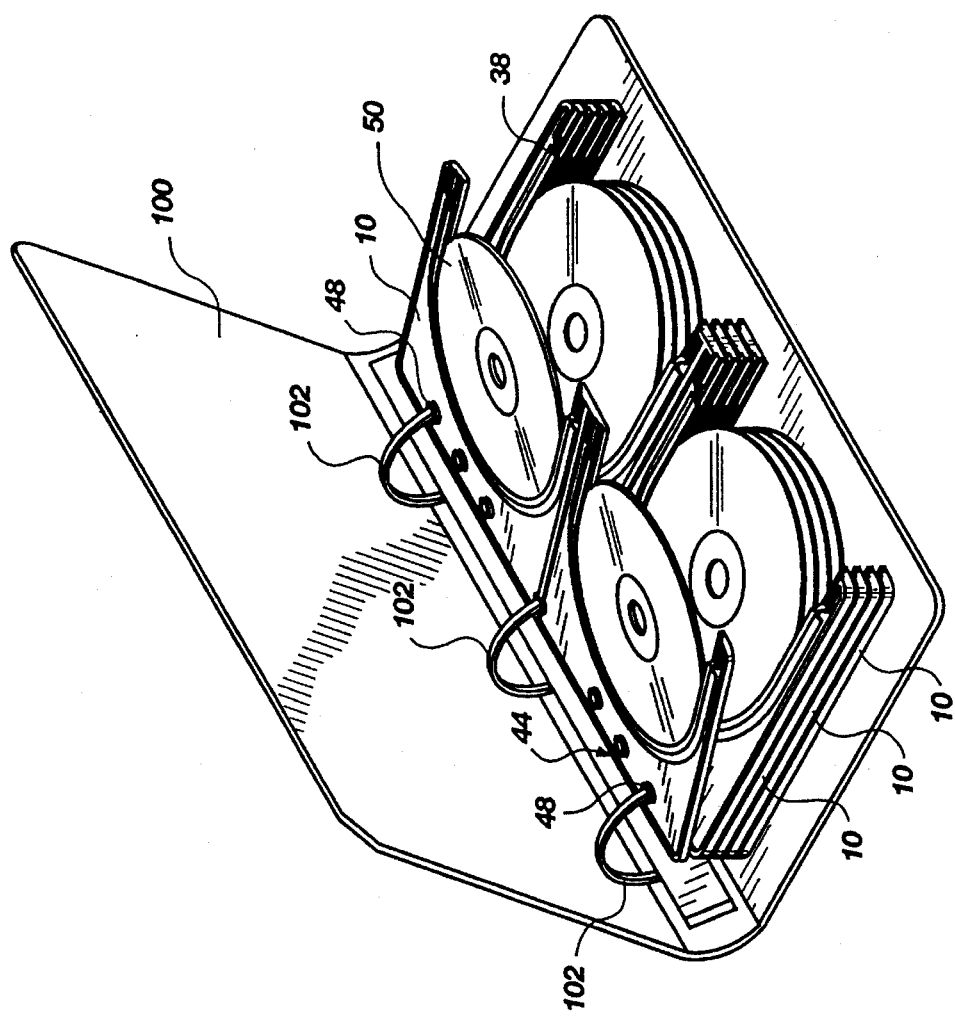
FIG. 5 is a view in perspective of a plurality of disc retainer devices secured within a three-ring binder.

The disc retainer 10 of the present invention is configured to allow the adjacent alignment, or stacking, of a number of disc retainers together for storage or cataloging purposes. As illustrated in FIG. 5, a number of disc retainers 10 may be stacked and bound together by any appropriate means, such as a three-ring binder 100. Each disc retainer 10 is configured with means 44, such as apertures 48, for retaining multiple numbers of disc retainers 10 together in adjacent registration with each other. The apertures 48 are sized and spaced apart to accommodate placement of rings 102 therethrough for securement within the binder 100. Other equally suitable means for securing multiple numbers of disc retainers 10 together, such as in a box, may be provided in association with the retainer plate 14 of the invention.

The present invention is directed to providing a disc retainer device which is configured to permit easy insertion and removal of discs, such as compact discs, from the retainer using a single hand, and in a manner which permits handling of the disc without touching the information-carrying or encoded portion of the disc. The ability to easily insert and remove a disc from the disc retainer is particularly advantageous when only a single hand is available, such as when driving in a car. The configuration of the disc retainer also provides means for conjoining or stacking a number of disc retainers together for storage, and the ability to store discs together in such a manner facilitates transporting and storing compact discs in the car, for example. By virtue of the construction of the disc retainer of the present invention, the discs stored in the disc retainers are held in a safe and spaced apart arrangement when multiple numbers of disc retainers are stacked together. The present invention may be adapted to the retention and storage of any flat, substantially round disc-shaped object, and particularly to compact discs, laser discs and vinyl records of all sizes. The structure of the invention may be modified to meet the demands of the particular application. Hence, reference herein to specific details of the illustrated embodiments is by way of example and not by way of limitation. It will be apparent to those skilled in the art that many additions, deletions and modifications to the illustrated embodiments of the invention may be made without departing from the spirit and scope of the invention as defined by the following claims.

What is claimed is:

1. A disc retainer device comprising:

a leaf having opposing surfaces defining a thickness of selected dimension therebetween;

a non-linear channel formed through said thickness of said leaf and having a length extending between a first end and a second end and configured to retainingly receive a substantially flat edge of a disc, said channel having a first lip and a second lip;

a void formed through said thickness of said leaf along said length of said channel and between said first end and said second end;

an opening defined between said first end and said second end of said channel sized to receive a disc;

opposing contact ledges formed in said first lip of said channel and spaced a distance from said first end and said second end of said channel, said opposing contact ledges being spaced apart from each other a distance sufficient to receive a disc therebetween and configured to position a disc thereagainst in non-parallel orientation to said channel; and at least one edge engaging means positioned within said channel for securely engaging said flat edge within said channel.

2. The disc retainer device of claim 1 further comprising at least one spacing surface extending beyond at least one of said opposing surfaces of said leaf to contact and maintain an adjacent leaf in spaced arrangement from said channel.

3. The disc retainer device of claim 2 wherein said leaf has an outer periphery with a raised flange thereabout, said flange forming said spacing surface.

4. The disc retainer device of claim 2 further comprising means associated with said leaf for securing said leaf in adjacent registration with at least one other leaf.

5. The disc retainer device of claim 4 wherein said edge engaging means is a protrusion positioned within said channel proximate said opening.

6. A retainer device for holding round, flat discs therein in secure engagement comprising:

a flat plate having a periphery and opposing sides defining a thickness therebetween;

at least one U-shaped channel formed through said flat plate parallel to said opposing sides and sized to receive a flat disc, said at least one channel having a first lip and a second lip, said first lip having a first end and a second end spaced a distance from said periphery of said flat plate and said second lip having a first end and a second end positioned at said periphery of said plate;

a void formed through said thickness of said flat plate positioned about said channel;

two opposing and aligned ledges formed by said first end and said second end of said first lip; and at least one engagement means positioned in said at least one channel for engaging an edge positioned in said at least one channel.

7. The retainer device of claim 6 further comprising at least one spacing surface positioned to extend outwardly a distance from one of said opposing sides of said flat plate and positioned away from said first lip and said second lip of said at least one channel.

8. The retainer device of claim 7 further comprising means associated with said plate for securing said plate in adjacent registration with at least one other plate.

9. The retainer device of claim 8 wherein said means for securing said plate in adjacent registration comprises apertures formed through said plate and each sized for receiving a ring therethrough.

10. The retainer device of claim 7 wherein the opposing side of said opposing side to which said at least one spacing surface is positioned has attached thereto at least one spacing surface extending a distance outwardly from said opposing side and positioned away from said first lip and said second lip of said at least one channel.

11. The retainer device of claim 6 wherein said at least one engagement means is a protuberance formed within said channel.

12. A method for retaining a flat, circular disc in a disc retaining device comprising the steps of:

providing a disc retainer device having a non-linear channel configured to receive the edge of a flat, circular disc therein, said channel having an opening and opposing ledges formed along said channel proximate said opening and having a void positioned about said channel;

positioning a flat, circular disc through said void in contact with and against said opposing ledges associated with said channel, and orienting said disc at an angle to said channel;

rotating said flat, circular disc through said void to bring said edge of said flat, circular disc in alignment with said channel; and inserting said disc into said channel to seat thereagainst.

13. The method of claim 12 wherein said disc retainer device further comprises an edge engagement means positioned within said channel, and further comprising the step of inserting the disc within the channel until the edge engagement means engages said edge of said disc to securely retain said disc within said channel.

* * * * *